United States Patent
Krueger

[11] 3,792,222
[45] Feb. 12, 1974

[54] ANTI-SINGLE PHASING DEVICE

[75] Inventor: Keith Theophil Krueger, Bellefontaine, Ohio

[73] Assignee: ITE Imperial Corporation, Philadelphia, Pa.

[22] Filed: May 8, 1972

[21] Appl. No.: 251,288

[52] U.S. Cl. .................. 200/169 R, 337/7, 337/46, 337/50, 337/146
[51] Int. Cl. ........................ H01h 3/20, H01h 85/00
[58] Field of Search.. 317/46; 337/7, 8, 45, 46, 146, 337/38, 50, 78; 200/16 A, 169 R

[56] References Cited
UNITED STATES PATENTS

| | | | |
|---|---|---|---|
| 2,965,809 | 12/1960 | Edsall | 337/7 |
| 3,510,811 | 5/1970 | Pokorny et al. | 317/46 X |
| 3,139,557 | 6/1964 | Steelman | 317/46 X |
| 3,309,478 | 3/1967 | Kiesel et al. | 337/7 |

Primary Examiner—Bernard A. Gilheany
Assistant Examiner—A. T. Grimley
Attorney, Agent, or Firm—Ostrolenk, Faber, Gerb & Soffen

[57] ABSTRACT

A motor controlling system, including a conventional multipole electromagnetic contactor and associated overload relay means, is provided with motor short circuit protector means in the form of fast acting fused protector units connected in series with the heaters of the overload relay means and the motor windings. Under relatively low fault current conditions, the overload relay means opens the contactor actuating coil circuit, and under severe fault conditions the fused protector units become active to open the energizing circuit for the holding coil of the electromagnet.

At currents in excess of 5.5 to 6.5 times full load motor current, this being the locked rotor current for most motors, the fused protector unit blows faster than the overload relay trips, thereby protecting the branch wire contactor and the overload relay means. Actuation of a fused protector unit causes an ejector pin thereof to operate a common trip bar which, in turn, opens a switch in the coil circuit. This trip bar is part of an anti-single phasing unit that is selectively positionable with respect to the clips which mount the fused protector units, thereby cooperating with fused protector units of different sizes. These clips are provided with integral formations which serve a blocking or non-interchangeability function, thereby preventing oversized fused protector units from being mounted to the clips. The antisingle phasing unit and protector unit holding clips are mounted on one surface of a relatively shallow molded housing having disconnect switch means mounted therein.

5 Claims, 14 Drawing Figures

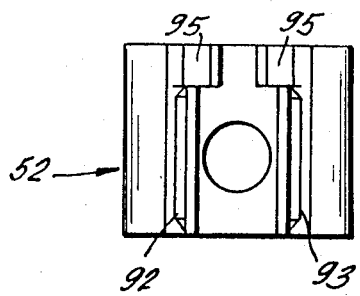
FIG. 6A.
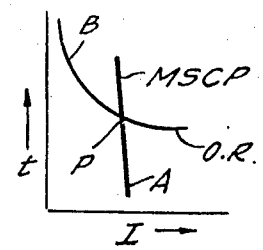
FIG. 9.
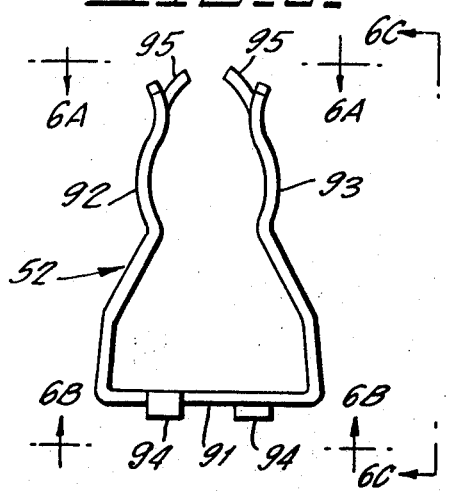
FIG. 6.
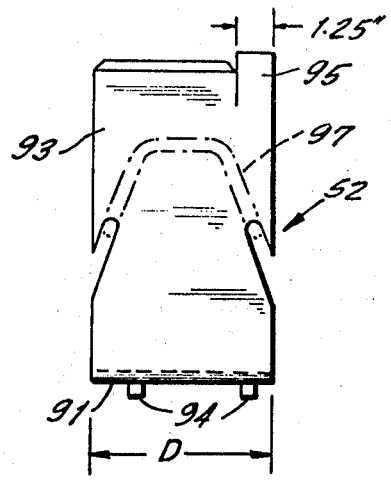
FIG. 6C.
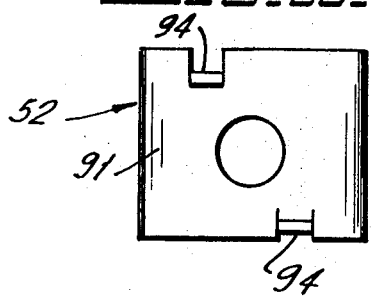
FIG. 6B.
FIG. 8.
| SIZE | A | B | C | D |
|---|---|---|---|---|
| M & N | 1/2 | 3 7/8 | 7/8 | 5/8 |
| O & P | 5/8 | 4 1/8 | 1 | 3/4 |
| R & S | 3/4 | 4 3/8 | 1 7/32 | 7/8 |
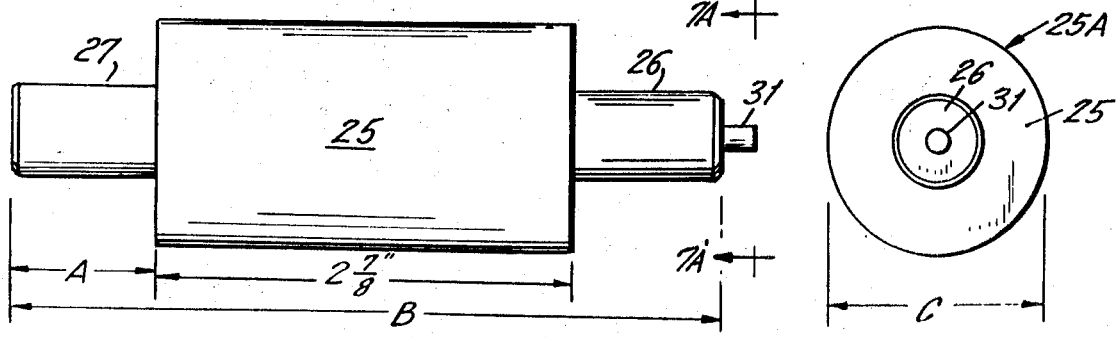
FIG. 7.
FIG. 7A.

ANTI-SINGLE PHASING DEVICE

This invention relates to motor controls in general, and relates more particularly to an improvement of the motor starter system disclosed in U. S. Pat. No. 2,965,809 issued Dec. 20, 1960 to W. S. Edsall for "Motor Starters".

Conventionally a motor is protected against electrical damage by an overload relay. At currents slightly higher than locked rotor current the overload relay protects the motor branch circuit as long as the motor starter is self-protecting or the current is less than 13 times full load motor current, whichever is smaller. When bolted or arcing faults cause higher currents to flow through the branch circuits, very often the branch wire, overload relay or contactor will be damaged if the branch circuit is not disconnected rapidly from the line.

The instant invention provides interrupting means in the form of fused elements designated as motor short circuit protectors. These protectors are constructed for circuit interruption in a short period of time at currents higher than indicated above, and are adapted to operate in coordination with conventional overload relays in order to protect the heaters of the latter at all currents higher than the current at which the overload relays protect themselves while utilizing the overload relays to effect interruption at running overloads or at lesser fault conditions.

The motor short circuit protectors, preferably one for each leg of the circuit energizing the motor, are mounted to clips, resembling fuse clips, secured to one surface of a relatively shallow housing having a manually operable disconnect switch therein. Also mounted to the housing and selectively positionable thereon is an anti-single phasing device including a common tripper bar and a normally closed switch. Actuation of any of the motor short-circuit protectors is effective to release a spring biased pin thereof to operate the tripper bar which, in turn, operates the switch to open position to interrupt the holding circuit for the electromagnetic contactors.

The clips include spaced arms having integrally formed projections that act as a blocking or projection means which prevents utilization of improperly rated motor short circuit protectors.

Accordingly, a primary object of this invention is to provide a novel construction for an anti-single phasing device having particular use as part of a motor control system.

Another object is to provide an anti-single phasing device that may be readily and selectively located in a plurality of operative positions for operation in coordination with a range of differently rated motor short circuit protectors.

These objects as well as other objects of this invention will become readily apparent after reading the following description of the accompanying drawings in which:

FIG. 6 is a front elevation of one of the clips for mounting a motor short circuit protector unit.

FIGS. 6A, 6B and 6C are top, bottom and side elevations respectively of the clip of FIG. 6 looking in the direction of the respective pairs of arrows 6A—6A, 6B—6B, and 6C—6C of FIG. 6.

FIG. 7 is a side elevation of a blown motor short circuit protector unit.

FIG. 7A is an end view of the unit of FIG. 7 looking in the direction of arrows 7A—7A of FIG. 7.

FIG. 8 is a dimension chart correlating the structures of FIGS. 6C, 7 and 7A.

FIG. 9 is a graph of MSCP and overload relay tripping characteristics.

Figure 1:
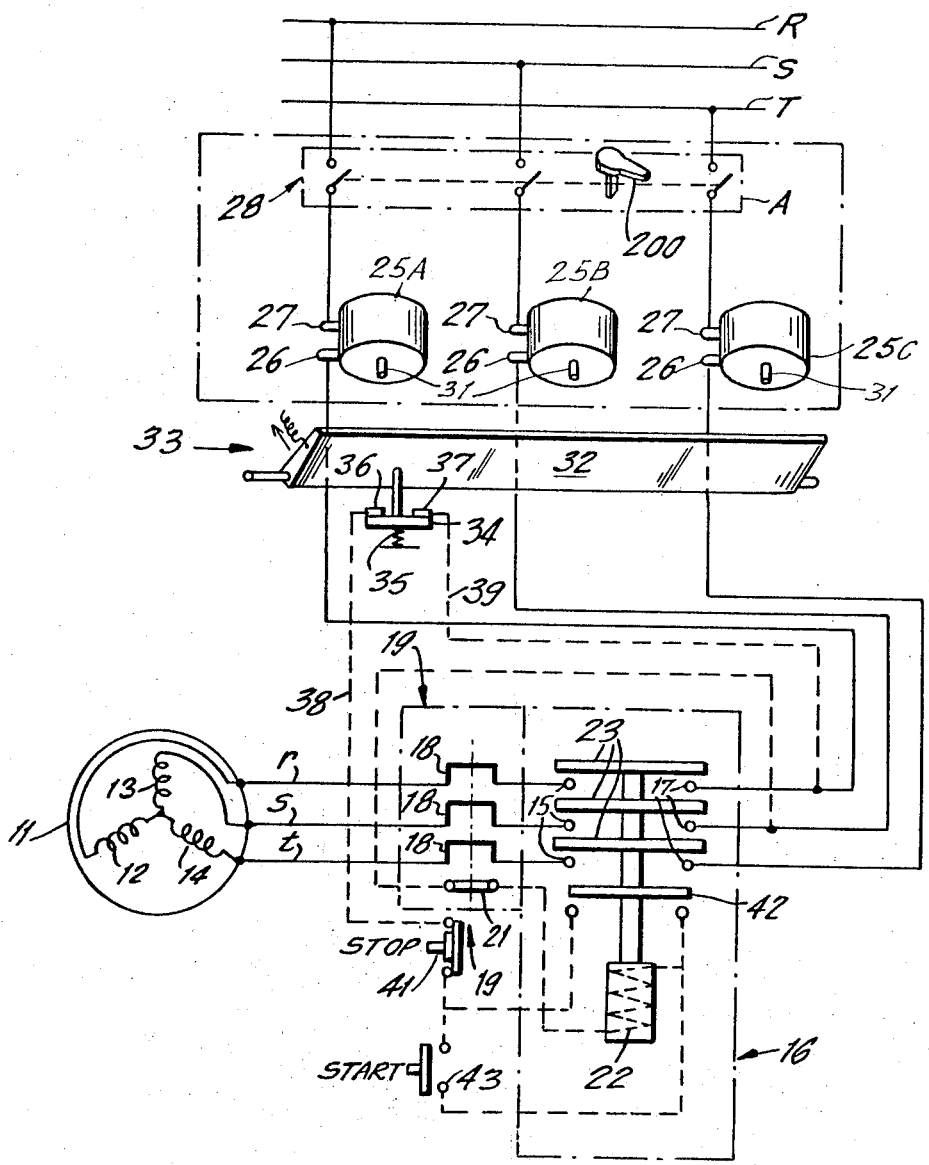
FIG. 1 is an electrical schematic of a motor control system including elements illustrated in detail in the other figures of this specification.
Figure 2:
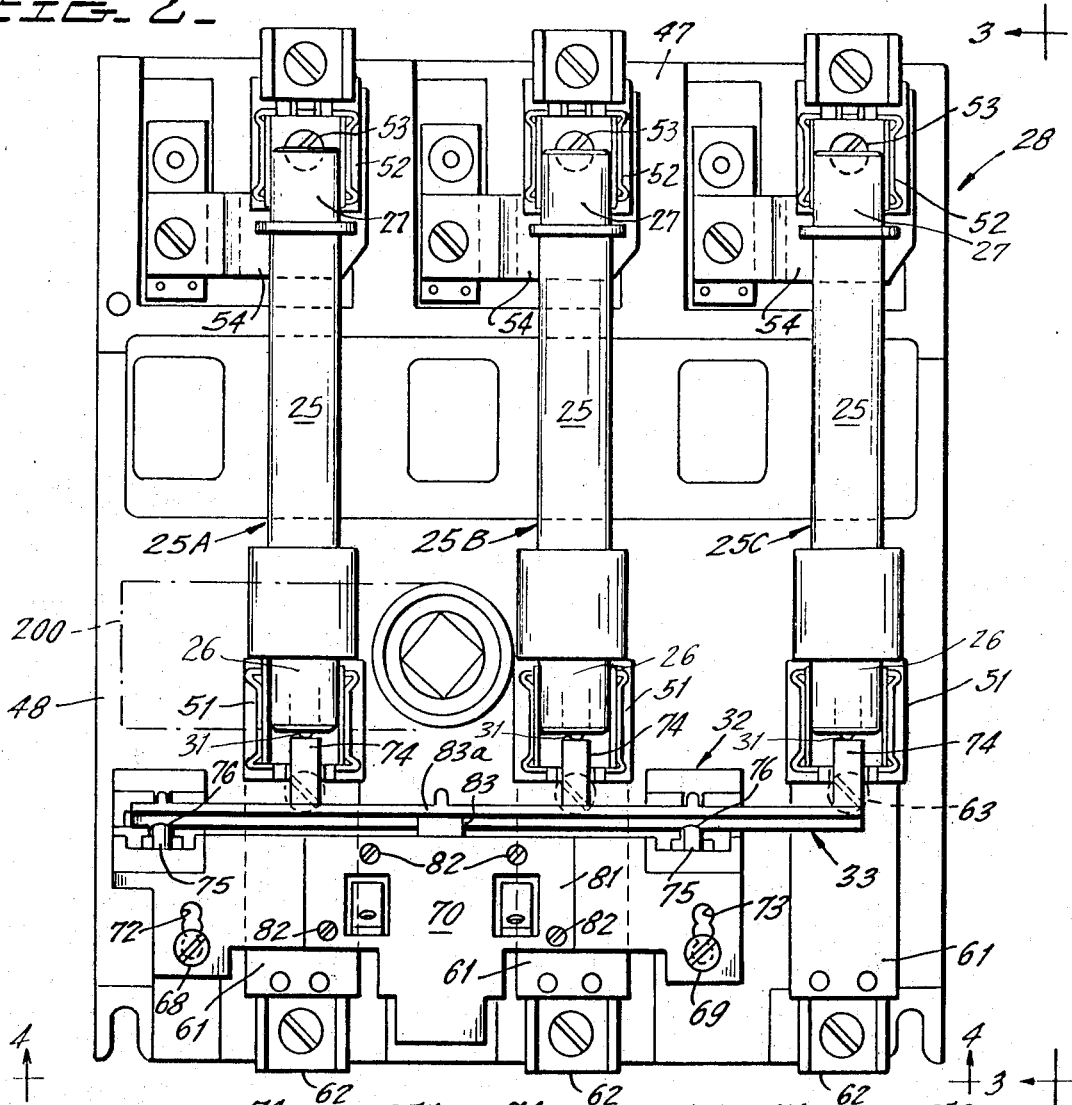
FIG. 2 is a plan view of the motor short circuit protector and disconnect switch unit in combination with an anti-single phasing device constructed in accordance with teachings of the instant invention.
Figure 4:
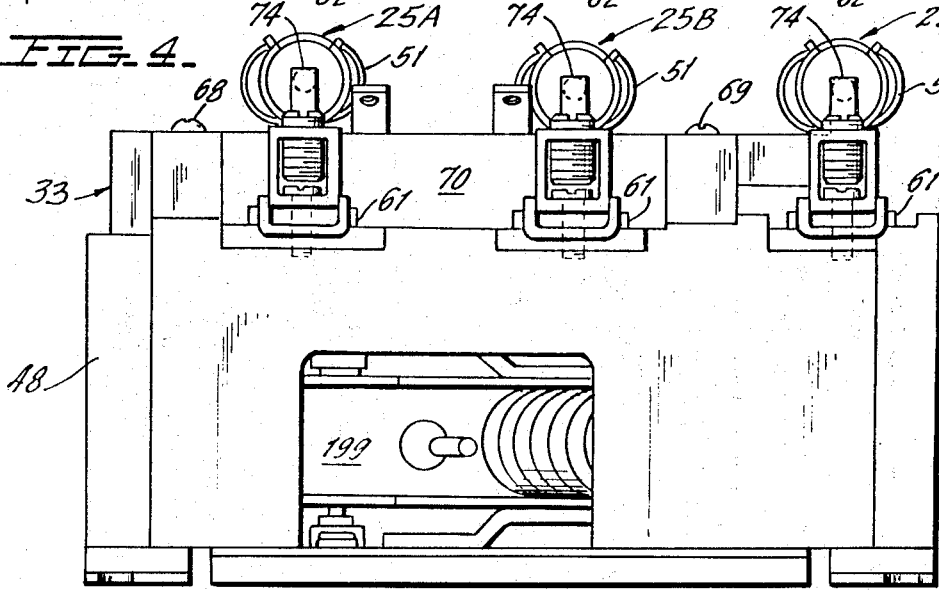
FIG. 4 is an end view of the unit of FIG. 2 looking in the direction of arrows 4—4 of FIG. 2.
Figure 3:
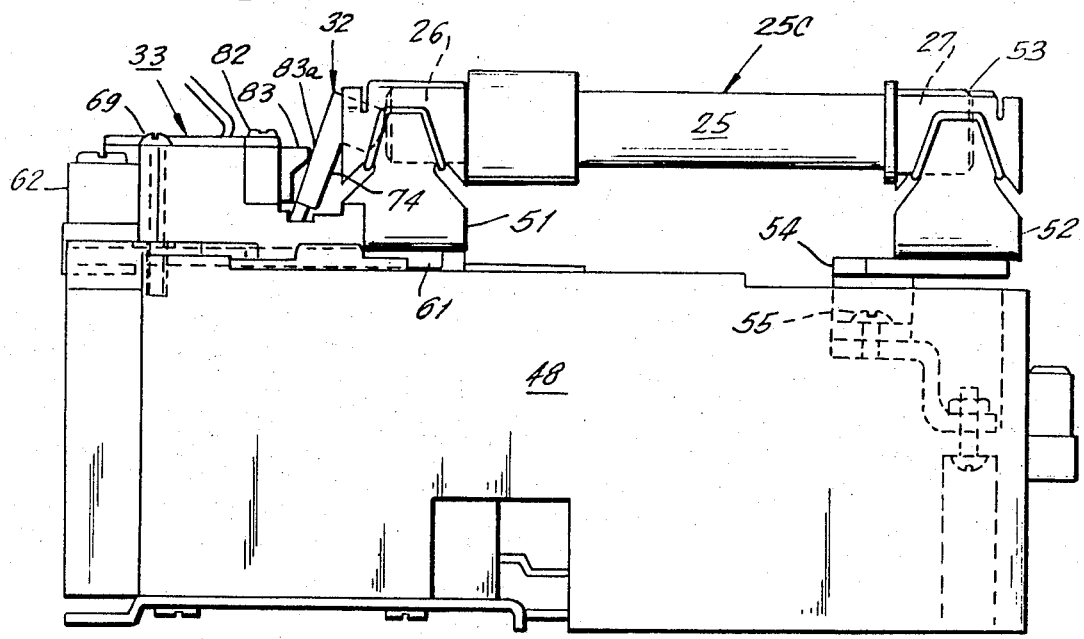
FIG. 3 is a side elevation of the unit of FIG. 2 looking in the direction of arrows 3—3 of FIG. 2.

Now referring to the Figures and more particularly to FIG. 1. Three phase motor 11 includes wye connected motor windings 12, 13, 14 connected through lines $r$, $s$, $t$ and individual heaters 18 to individual load terminals 15 of electromagnetic contact 16 having three movable contacts 23. Heaters 18 are part of three phase overload relay 19 of a type described in U. S. Pat. No. 3,288,964 issued Nov. 29, 1966 to J. B. Cataldo et al for a Spring Trip Multi-Phase Overload Relay Having a U-Shaped Bimetal with a Pivot Pin at Its Web Portion. In a manner well known to the art, when any of the heaters 18 becomes sufficiently heated, bimetal means (not shown) is effective to open normally closed contact means 21 and in so doing opens the energizing circuit for coil 22 which operates main bridging contacts 23 into engagement with their respective load and line contacts 15 and 17.

Contacts 17 are connected through other sections of conductors $r, s, t$ to load terminals 26 of the respective motor short circuit protector units (hereinafter MSCP) 25A, 25B, 25C whose respective line terminals 27 are connected through an individual pole of three-phase disconnect switch 28 to the respective energizing line R, S, and T. Each MSCP is of a construction illustrated in the copending applications (CS-253) Ser. No. 98,423 now U.S. Pat. No. 3,663,915, filed Dec. 15, 1970 and assigned to the assignee of the instant invention. In particular, each MSCP 25A, 25B, 25C includes a fusable element (not shown) having a rupturing characteristic indicated by curve A in FIG. 9, which upon rupturing releases striker pin 31 for engagement with common trip bar 32 of antisingle phasing unit 33.

Unit 33 also includes bridging contact 34, biased by spring 35 toward engagement with stationary contacts 36, 37 that are connected through lines 38, 39, respectively, to stop switch 41 and line $r$ respectively. Thus, switch 34, 36, 37 is in the energizing circuit for contactor operating coil 22, such circuit also including normally closed stop switch 41 and holding contact 42, the latter being operated to closed position by energization of coil 22. Normally open start switch 43 parallels holding switch 42.

Disconnect switch 28 is generally of the type described in U. S. Pat. No. 3,349,208 issued Oct. 24, 1967 to J. B. Cataldo et al for a Toggle Lever Actuated Manually Operated Circuit Controller, and includes molded main housing part 47 which encloses the disconnect switch contacts and operating mechanism 199 controlled by handle 200. Upper surface 48 of housing 47 supports three pairs of spaced clips 51, 52 for mounting the respective MSCP's 25A, 25B, 25C. In particular, the clip 52 for MSCP 25A is mounted by screw 53 to the raised leg of strap 54 whose lower leg is connected by screw 55 to the load terminal of disconnect switch 28.

Figure 5:
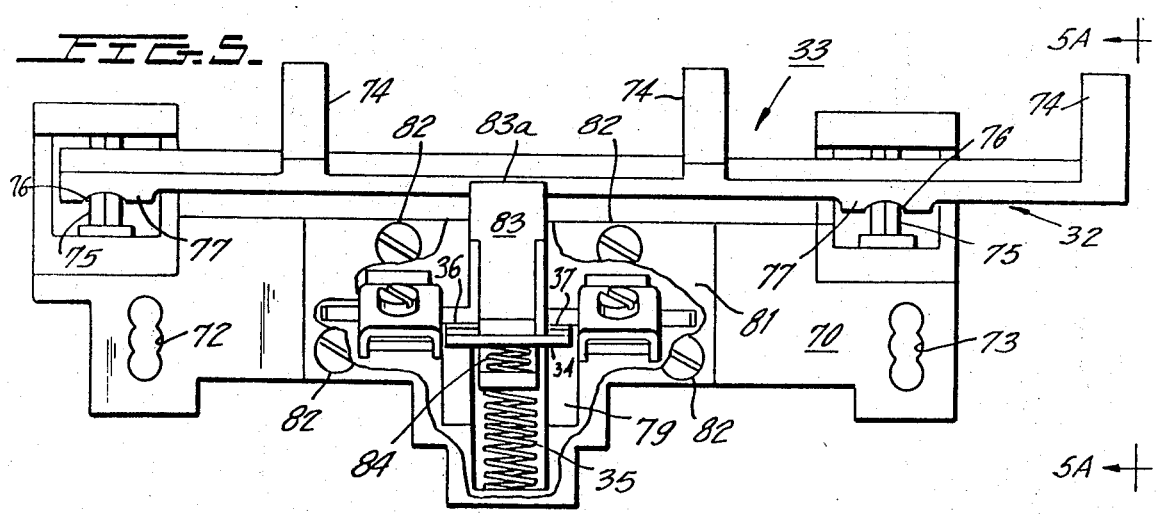
FIG. 5 is an enlarged plan view, partially sectioned, of the anti-single phasing unit.
Figure 5A:
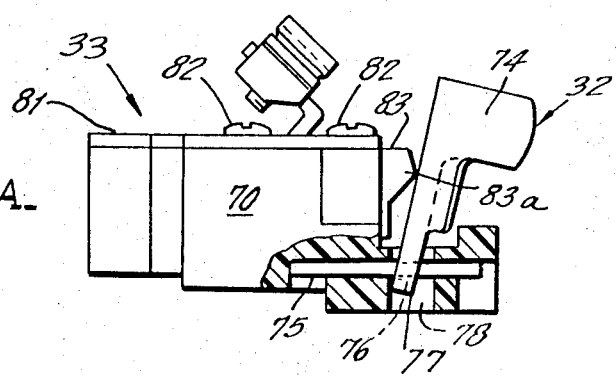
FIG. 5A is a side elevation of the unit of FIG. 5 looking in the direction of arrows 5A—5A of FIG. 5.

The other clip 51 for MSCP 25a is mounted to the upper surface of strap 61 at one end of the latter with load terminal wire grip 62 being at the other end of strap 61. Screw 63 secures strap 61 to upper surface 48 of switch housing 47. Screws 68, 69 extending through a selected section of three section apertures 72, 73, respectively, in molded insulating base 70 of anti-single phasing unit 33, secure unit 33 to housing surface 48 in an operative position such that MSCP striker pins 31, when ejected, engage radially upward extending ears 74 of trip bar 32 to pivot the latter in a counter-clockwise direction with respect to FIG. 5A. Roll pins 75, extending through elongated aperture 76 in ears 77 of trip bar 32 as well as through cavity 78 in base 70, provide a pivotal mounting for trip bar 32.

Switch contacts 34, 36, 37 are mounted within base cavity 79 having insulating cover sheet 81 mounted by four screws 82 to base 70. Operator 83 is provided with a cut-out portion through which bridging contact 34 extends and within which another contact pressure spring 84 is mounted. The force of spring 35 acting on plunger 83 is transmitted through spring 84 to bias contact 34 toward closed position. Spring 35 biases nose 83a of plunger 83 outside of cavity 79 into engagement with trip bar 32 in the midregion thereof, thereby urging trip bar 32 in a clockwise direction with respect to FIG. 5A.

MSCP 25A (FIGS. 7 and 7A) is provided with cylindrical body 25 having axially extending cylindrical terminals 26, 27 at opposite ends thereof. Striker pin 31 is also axially located, and prior to tripping of MSCP 25 pin 31 is retained within terminal 26.

Since terminal clips 51, 52 have identical construction only one of these clips, clip 52, will be described in detail. With particular reference to FIGS. 6–6C, clip 52 is constructed of resilient conducting material and is of generally U-shape having web 91 interconnecting arms or jaws 92, 93 which engage MSCP terminal 27 therebetween. Outwardly extending ears 94 of web 91 are received by recesses in strap 54 to prevent rotation of clip 52. The edges of jaws 92, 93 remote from clip 51 are each provided with integrally formed inward projection 95 which is operatively positioned to block proper mounting of an MSCP unit that is of excessive rating. Formed wire spring 97 urges jaws 92, 93 toward one another into firm electrical and mechanical engagement with MSCP terminal 27. As seen by studying the chart of FIG. 8 in relation to FIGS. 6C, 7 and 7A, MSCP 25 is one size unit in a family of three MSCP's having different dimensions and different ratings, and non-interchangeability formations 95 of clip 52 are operatively positioned to block mounting of those members of this MSCP family that are of excessive rating.

Reference is made to FIG. 9 which shows a steep current versus melting time characteristic of the MSCP in log-log scale. In particular, the crossover point P between the MSCP's melting characteristic A and the overload relay tripping characteristic B is chosen so that the MSCP will operate to cause opening of the operator coil circuit under severe overload conditions. In order to protect overload relay heaters 18 and motor 11, and to prevent nuisance blowing of the MSCP, crossover point P is generally in the range from 5.5 to 13 times full load current of motor 11 depending upon the current up to which overload relay 19 is self-protecting. For running overload conditions and currents under crossover point P of the two characteristics A and B, opening of the circuit for energizing coil 22 is caused by the operation of overload relay means 19.

Thus, it is seen that the instant invention provides a novel motor controlling system which includes a novel construction for an anti-single phasing unit utilizing a common tripper bar acted upon by striker pins of blown motor short circuit protectors.

Although there has been described a preferred embodiment of this novel invention, many variations and modifications will now be apparent to those skilled in the art. Therefore, this invention is to be limited not by the specific disclosure herein but only by the appending claims.

I claim:

1. An anti-single phasing device including a molded base having a cavity, switch contact means operable between an open and a closed position within said cavity, a switch operator projecting from said cavity, biasing means within said cavity urging said switch contact means to one of its said positions and urging said switch contact means to one of its said positions and urging said operator to project from said cavity, an elongated trip bar, mounting means securing said bar to said base for movement toward and away from said cavity about a pivotal axis generally parallel to the longitudinal axis of said bar, said operator engaging said bar at a point intermediate the ends thereof, whereby movement of said bar toward said cavity forces said operator into said cavity to operate said switch contact means to the other of its said positions and a plurality of elongated multisection mounting formations for selectively and predeterminedly positioning said device with respect to means for operating said bar.

2. A device as set forth in claim 1 in which the bar includes first and second radial ears positioned on opposite sides of the point of engagement between said operator and said bar, said base including recesses into which said ears extend, said mounting means including pins extending into said recesses and said ears.

3. A device as set forth in claim 2 in which the pins are generally perpendicular to the pivotal axis.

4. A device as set forth in claim 3 in which each of the elongated multisection mounting formations is an aperture defined by first and second elongated sidewalls each including a plurality of adjacent concave sections operatively positioned with the concave sections of said first sidewall aligned with and facing the concave sections of said second sidewall.

5. A device as set forth in claim 1 in which each of the elongated multisection mounting formations is an aperture defined by first and second elongated sidewalls each including a plurality of adjacent concave sections operatively positioned with the concave sections of said first sidewall aligned with and facing the concave sections of said second sidewall.

* * * * *